US008156111B2

(12) United States Patent
Jones et al.

(10) Patent No.: US 8,156,111 B2
(45) Date of Patent: Apr. 10, 2012

(54) IDENTIFYING AND EXPANDING IMPLICITLY TEMPORALLY QUALIFIED QUERIES

(75) Inventors: Rosie Jones, Cambridge, MA (US); Donald Metzler, Santa Clara, CA (US); Fuchun Peng, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 472 days.

(21) Appl. No.: 12/277,059

(22) Filed: Nov. 24, 2008

(65) Prior Publication Data

US 2010/0131538 A1 May 27, 2010

(51) Int. Cl.
*G06F 17/30* (2006.01)
(52) U.S. Cl. .................. 707/721; 707/725; 707/723
(58) Field of Classification Search .............. 707/721, 707/723, 725
See application file for complete search history.

(56) References Cited

U.S. PATENT DOCUMENTS

| | | | | |
|---|---|---|---|---|
| 7,752,209 | B2* | 7/2010 | Ramer et al. | 707/752 |
| 7,809,721 | B2* | 10/2010 | Putivsky et al. | 707/724 |
| 7,934,161 | B1* | 4/2011 | Denise | 715/738 |
| 7,979,425 | B2* | 7/2011 | Garg et al. | 707/721 |
| 8,005,823 | B1* | 8/2011 | Marshall et al. | 707/721 |
| 8,046,355 | B2* | 10/2011 | Alfonseca et al. | 707/721 |
| 2005/0076012 | A1* | 4/2005 | Manber et al. | 707/3 |
| 2006/0235816 | A1* | 10/2006 | Yang et al. | 707/1 |
| 2006/0253427 | A1* | 11/2006 | Wu et al. | 707/3 |
| 2007/0226321 | A1* | 9/2007 | Bengtson | 709/219 |
| 2008/0065617 | A1* | 3/2008 | Burke et al. | 707/5 |
| 2009/0063461 | A1* | 3/2009 | Wang et al. | 707/5 |
| 2009/0063479 | A1* | 3/2009 | Millett et al. | 707/6 |
| 2009/0089266 | A1* | 4/2009 | Gollapudi et al. | 707/4 |
| 2009/0222321 | A1* | 9/2009 | Liu et al. | 705/10 |
| 2009/0293011 | A1* | 11/2009 | Nassar | 715/781 |
| 2010/0082604 | A1* | 4/2010 | Gutt et al. | 707/721 |
| 2010/0094835 | A1* | 4/2010 | Lu et al. | 707/705 |

OTHER PUBLICATIONS

A. Broder, "A Taxonomy of Web Search", SIGIR Forum, 36(2):3-10, 2002.
S. Chien, et al., "Semantic Similarity Between Search Engine Queries Using Temporal Correlation", WWW, pp. 2-11, 2005.
H. Cui, et al., "Probabilistic Query Expansion Using Query Logs", Proc. 11$^{th}$ Intl. Conf. on World Wide Web, pp. 325-332, 2002.
F. Diaz, et al., "Using Temporal Profiles of Queries for Precision Prediction", Proc. 27$^{th}$ Ann. Intl., ACM SIGIR Conf. on Research and Development in Information Retrieval, pp. 18-24, 2004.
R. Jones, et al., "Generating Query Substitutions", WWW, pp. 387-396, 2006.
J. Kleinberg, "Bursty and Hierarchical Structures in Streams", Proc. 8$^{th}$ Ann. Intl. ACM SIGKDD Conf. 91-101, 2002.
X. Li, et al., "Time-based Language Models", *Knowledge Management*, pp. 469-475, 2003.
B. Liu, et al., "Measuring the Meaning in Time Series Clustering of Text Search Queries", CIKM, pp. 836-837, 2006.

(Continued)

*Primary Examiner* — Rehana Perveen
*Assistant Examiner* — Tiffany Thuy Bui
(74) *Attorney, Agent, or Firm* — Weaver Austin Villeneuve and Sampson LLP

(57) ABSTRACT

Methods and apparatus are described for identifying implicitly temporally qualified queries, i.e., queries for which a time period is implied but not explicitly stated, and for expanding such queries to include one or more temporal references.

14 Claims, 5 Drawing Sheets

OTHER PUBLICATIONS

Q. Mei, et al., "A Probabilistic Approach to Spatiotemporal Theme Pattern Mining on Weblogs", Proc. 15$^{th}$ Intl. Conf. on World Wide Web, pp. 533-542, 2006.

D. Metzler, et al., "A Markov Random Field Model for Term Dependencies", Proc. 28$^{th}$ Ann. Intl. ACM SIGIR Conf. on Research and Development in Information Retrieval, pp. 472-479, 2005.

P. Ogilvie, et al., "Combining Document Representations for Known-Item Search", Proc. 26$^{th}$ Ann. Intl. ACM SIGIR Conf. on Research and Development in Information Retrieval, pp. 143-150, 2003.

F. Peng, et al., "Context Sensitive Stemming for Web Search", Proc. 30$^{th}$ Ann. Intl. ACM SIGIR Conf. on Research and Development in Information Retrieval, pp. 639-646, 2007.

S. Robertson, et al., "Simple BM25 Extension to Multiple Weighted Fields", *Proc. 13$^{th}$ Intl. Conf. on Information and Knowledge Management*, pp. 42-49, 2004.

J. J. Rocchio, "Relevance Feedback in Information Retrieval", pp. 313-323, 1971.

T. Tao, et al., "An Exploration of Proximity Measures in Information Retrieval", Proc. 30$^{th}$ Ann. Intl. ACM SIGIR Conf. on Research and Development in Information Retrieval, pp. 295-302, 2007.

* cited by examiner

IDENTIFYING AND EXPANDING IMPLICITLY TEMPORALLY QUALIFIED QUERIES

BACKGROUND OF THE INVENTION

The present invention relates to techniques for expanding search queries and, more specifically, to identifying and expanding queries which are implicitly temporally qualified.

Search engines employ a variety of techniques in attempting to provide the most relevant search results in response to user search queries. At least some of these techniques attempt to make up for the fact that most search queries may be characterized by some level of inherent ambiguity. That is, when users formulate queries they often omit search terms which, if included, would yield search results more closely correlated with their actual intent. To deal with this, search engines often use information relating to the user (e.g., demographic and/or personal information, expressed preferences, geographic information, past online behavior, etc.) to order search results based on the assumption that this kind of information generally correlates to the intent implicit in a particular user's search queries.

However, while such techniques have been shown to have some general utility, they are not necessarily reflective of a particular user's implicit intent in specific instances, thus leading to rendering of search results not reflective of the user's intent and the possibility of negative user experience.

SUMMARY OF THE INVENTION

According to one class of embodiments of the present invention, methods and apparatus are provided for responding to a first search query that does not include an explicit temporal reference. The first search query is received from a user device and determined to be implicitly temporally qualified with reference to a first query term included in the first search query and query log data that relate a plurality of previous query terms included in previous search queries to specific temporal references included in the previous search queries. The first search query is expanded to include one or more of the specific temporal references. First search results are generated using the expanded first search query, and transmitted to the user device.

According to another class of embodiments, methods and apparatus are provide for presenting search results on a user device in response to a first search query that does not include an explicit temporal reference. A search interface is provided on the user device in which a user enters the first search query. A search results interface is provided on a user device in which search results are presented that are responsive to a first expanded version of the first search query. The first expanded version of the first search query includes one or more temporal reference not included in the first search query.

According to yet another class of embodiments, methods and apparatus are provided for responding to a first search query that does not include an explicit temporal reference. The first search query is received from a user device and determined to be implicitly temporally qualified with reference to a first query term included in the first search query and query log data that relate a plurality of previous query terms included in previous search queries to specific temporal references included in the previous search queries. First search results responsive to the first search query are generated, and transmitted to the user device. The first search results are ranked in accordance with a predetermined ranking function derived with reference to the query log data.

According to yet another class of embodiments, a system is provided for responding to a first search query that does not include an explicit temporal reference. At least one data store has query log data stored therein. The query log data relates a plurality of previous query terms included in previous search queries to specific temporal references included in the previous search queries. A least one computing device is configured to receive the first search query from a user device and determine that the first search query is implicitly temporally qualified with reference to a first query term included in the first search query and the query log data. The at least one computing device being further configured to generate first search results responsive to the first search query and taking the query log data into account, and to transmit the first search results to the user device.

A further understanding of the nature and advantages of the present invention may be realized by reference to the remaining portions of the specification and the drawings.

DETAILED DESCRIPTION OF SPECIFIC EMBODIMENTS

Figure 1:
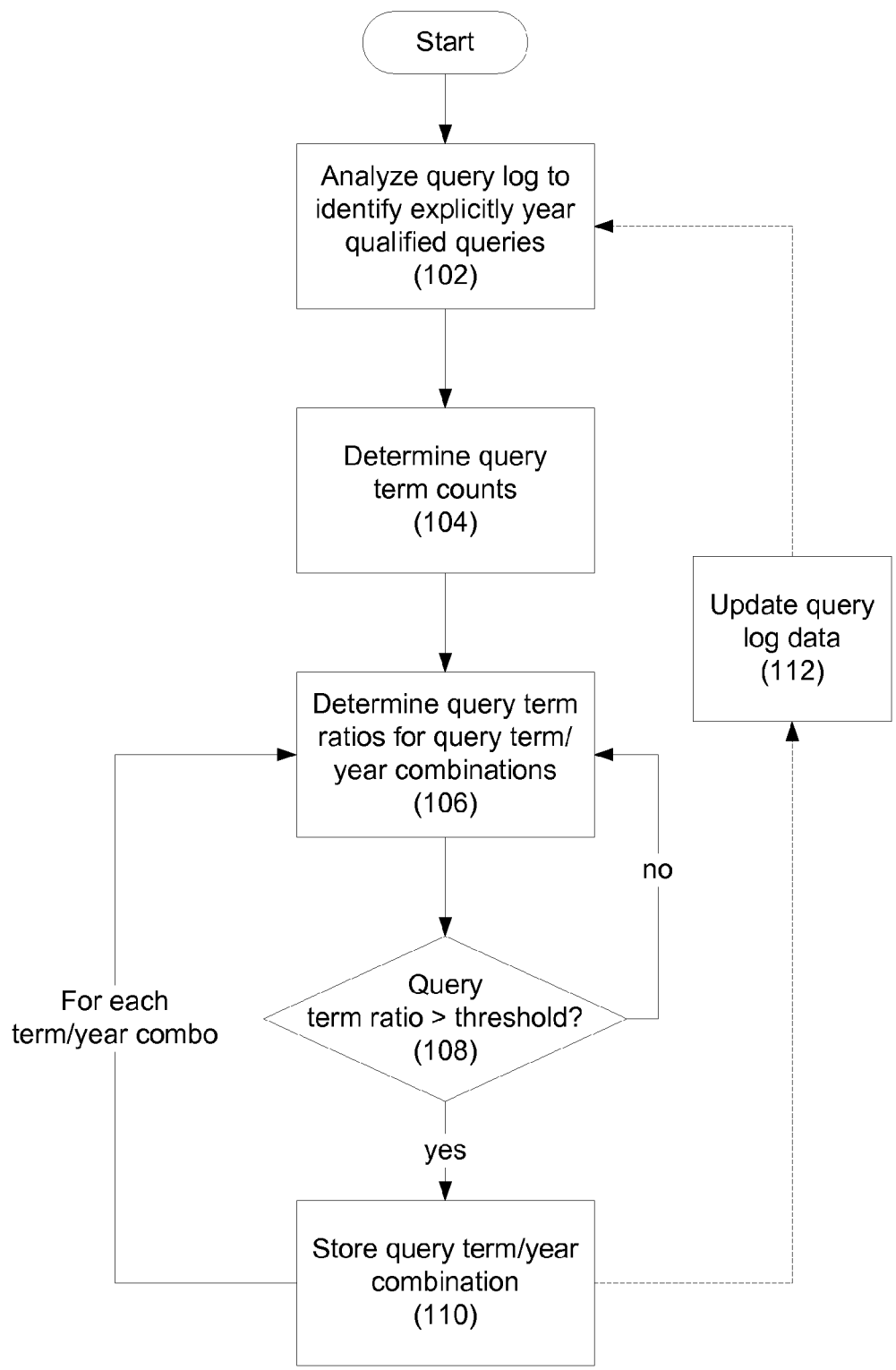
FIG. 1 is a flowchart illustrating generation of query log data for use in identifying implicitly temporally qualified queries according to a particular embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, techniques are provided by which search queries which do not explicitly include temporal references are identified as likely to be implicitly temporally qualified. Such queries may then be reformulated to include one or more temporal references, and search results may be generated based on the reformulated query.

Examples of specific embodiments of the invention that are based on query log analysis are described below. These embodiments focus on the implicit temporal qualifications being years. However, it will be understood that the techniques described herein may be readily applied to a much broader range of temporal references. Referring now to the flowchart of FIG. 1, a query log (e.g., from Yahoo! Search, Google, or any other search engine or service) is analyzed to count the occurrences of each query which has a year explicitly specified (102), e.g., as a prefix or suffix. So, for example, for the query "Olympics," each occurrence of the term "Olympics" with a particular year, e.g., "2000," "2004," "2008," etc., is counted. That is, an "explicitly year qualified" count is performed for each combination of the query term and a particular year.

Counts are also determined for the total number of occurrences of each query term (104). The ratio of the explicitly year qualified count for each query term/year combination to the total count for that query term is then determined (106). According to a particular embodiment, query log data for a given query term/year combination is only stored for use in identify implicitly year qualified queries (110) if the ratio for that query term and year exceeds some programmable threshold value (108), e.g., in the range of about 0.10-0.20. That is, only if the threshold is exceeded will queries containing that query term be deemed likely to be implicitly year qualified. As will be understood, the appropriate threshold for a given application may be empirically determined to avoid misidentification of spurious queries.

It will be understood that the ratio described above is merely an example of one measure which might be used to identify particular query terms for use in identifying implicitly year qualified queries. For example, a ratio of the explicitly year qualified count to some other number (e.g., a count of the number of occurrences of the query term without an explicit reference to a year) might be used. More generally, any measure which indicates that a significant portion of the queries containing a particular query term were year qualified may be used.

According to a particular implementation, processing of the query logs is done offline and the results cached for use during online search query processing. As discussed above, these cached data may be updated from time to time to be reflective of trends in search query patterns. And it will be understood that the manner in which this information is stored may vary considerably without departing from the invention. According to a particular implementation, the cached query log data are represented in a table in which each query term has one or more associated year entries, each of which has its associated ratio value.

It should also be noted that a given query term will typically be associated in the query log data with multiple years, i.e., the query term may have more than one year for which the ratio (or other appropriate measure) exceeds the threshold (or otherwise indicates that queries containing the query term are likely to be implicitly year qualified). In this way, for any given query term a distribution over years is maintained. And as will be understood, these query log data may be updated on an ongoing basis (112) so that they reflect changes in search behaviors.

Figure 2:
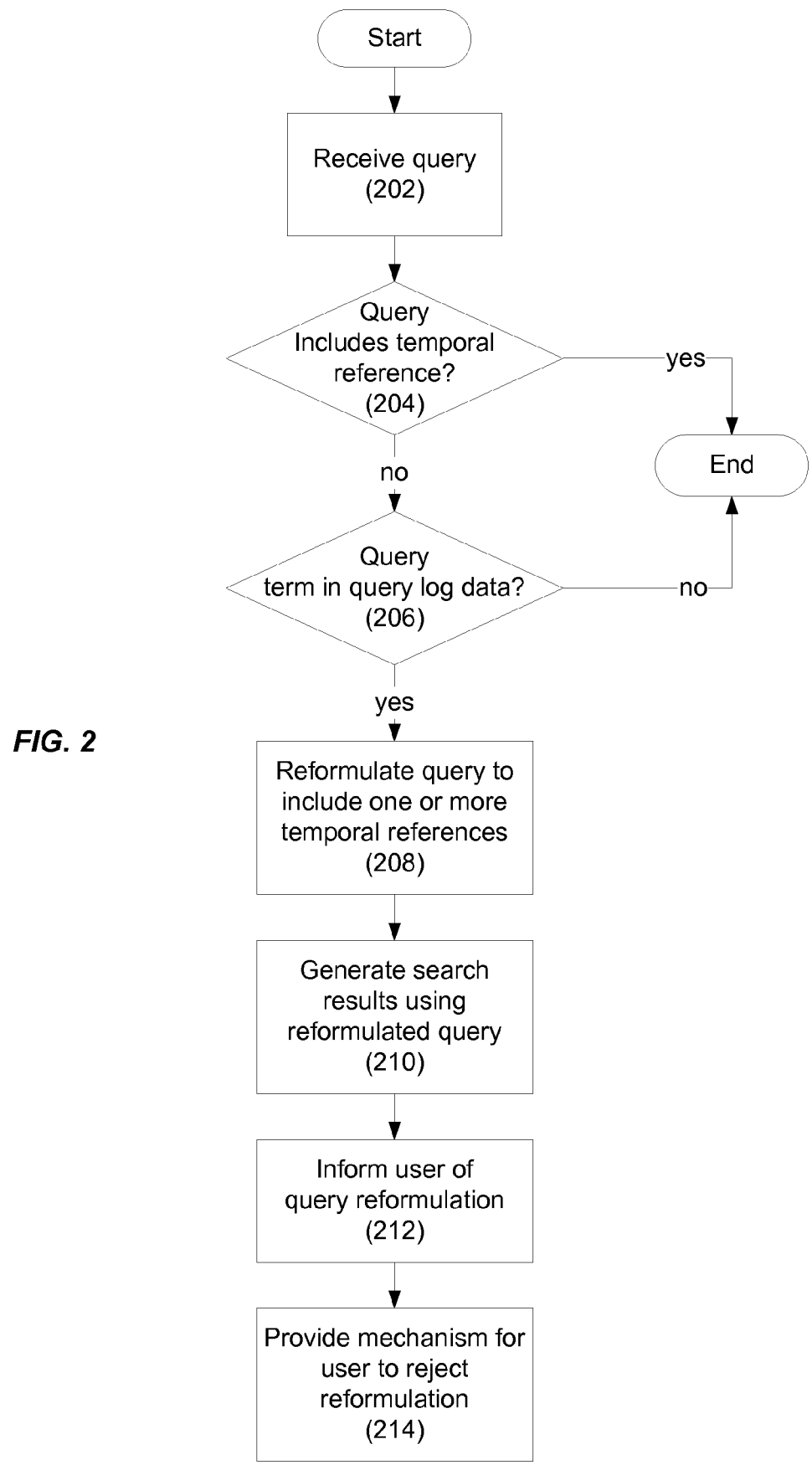
FIG. 2 is a flowchart illustrating identification and reformulation of implicitly temporally qualified queries according to a particular embodiment of the invention.

Once query log data have been generated they may be used to identify and reformulate subsequent queries including the query terms represented in the query log data. An example of the operation of one such embodiments is illustrated in the flowchart of FIG. 2. When a query is received (202), it is determined whether the query contains a temporal reference, e.g., a reference to a year (204), and if not, whether the query contains a query term represented in the query log data (206). If a query term is present which is also in the query log data, the query is considered an implicitly year qualified query, and the query is therefore reformulated to include one or more temporal references, e.g., years, (208). Search results are then generated that are responsive to the reformulated query (210).

As discussed above, a particular query term may be associated with multiple years in the query log data. In such cases, a variety of different decisions can be made regarding whether and how to modify an implicitly year qualified query containing that query term. For example, the query can be modified to include each of the years. In such cases, the added query terms and/or the search results can be weighted to reflect different emphases for the different years, e.g., in accordance with the ratios corresponding to each.

Alternatively, a decision could be made to modify the query only to include the year having the highest ratio or the most recent year. In such cases, there is a possibility that this will result in the wrong year being selected. However, this risk may be mitigated by providing additional feedback to the user such as, for example, a question associated with the search results, e.g., "Did you mean "2004 Olympics?" The user could then select a link associated with this question to obtain alternative search results for a different year or even for the original query formulation. Another alternative would be to present some sort of representation of the distribution over years for the query term, e.g., a timeline, from which the user could select a relevant year.

More generally, embodiments are contemplated in which the user is informed in some way that the original query was modified to include what was believed to be an implicit year (212) and then is provided with some mechanism to reject the modification and/or select a different modification, i.e., a different year (214). A variety of other alternatives for handling queries with multiple year possibilities will be apparent to those of skill in the art.

Figure 3:
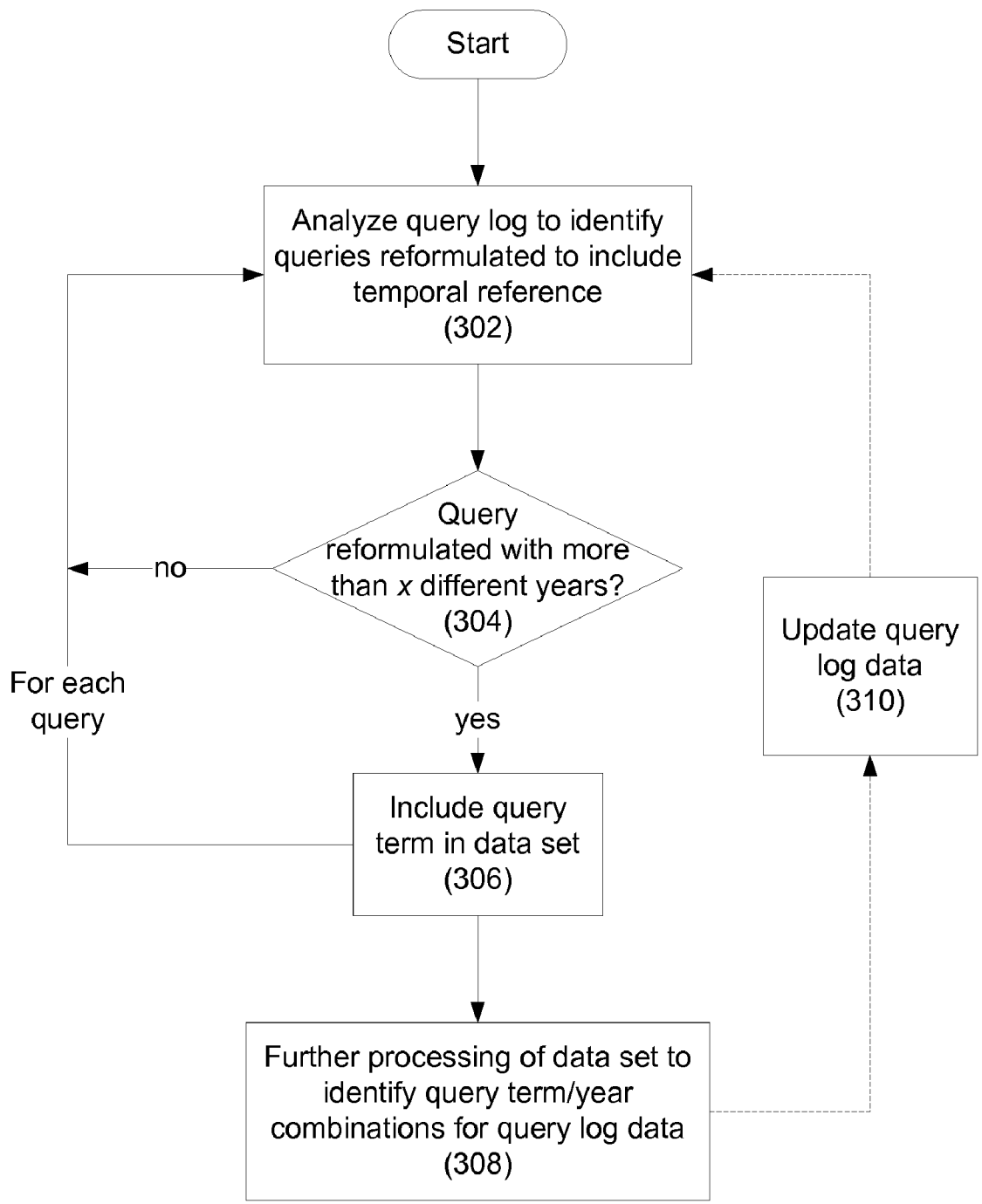
FIG. 3 is a flowchart illustrating filtering of query log data for use in identifying implicitly temporally qualified queries according to a particular embodiment of the invention.

According to some embodiments, the query log data that are used to identify implicitly year qualified queries are derived from queries that were reformulated by users within sessions. An example of this approach is illustrated in the flowchart of FIG. 3. The query log is analyzed to identify each time a user reformulates a query including a particular query term to add a temporal reference, e.g., a year, within a given session (302). If queries including a particular query term are reformulated multiple times using different years (304) they are kept in the data set (306). For example, if the query term "miss universe" was reformulated using every year from 2001 through 2008, then new queries containing that query term without an explicit reference to a year are considered likely to be implicitly year qualified queries. The appropriate threshold number of different years for inclusion in the data set may be identified empirically and may vary considerably without departing from the scope of the invention. According to a particular implementation, reformulated queries are filtered using a log-likelihood ratio test (see, for example, C. Manning and H. Schutze. *Foundation of statistical natural language processing*, MIT Press, 1999). This eliminates most coincidental occurrences of a query and a reformulation, i.e., only reformulations which frequently occur with a given year are included, and any infrequent rewriting of a query to add a year will not be included.

These data may then be further processed for inclusion in a cache table (308) for use in identifying implicitly temporally qualified queries. According to some embodiments, this further processing may be done in a manner similar to that described above with reference to FIG. 1. That is, the raw query logs may first be filtered to include only data relating to reformulated queries. These data may then be processed to identify the query terms and frequencies. And as with the frequency approach, this approach may involve ongoing offline mining of query logs (310) (e.g., Yahoo! Search query logs) to build a cache table which is then used to process search queries in real time.

A more formal description of certain aspects of a specific embodiment of the invention will now be provided. One important measure of the queries mined from the query log is how strongly they are associated with a given year. This value, which we call the year qualified weight, is defined as:

$$w(q,y) = \#(q,y) + \#(y,q) \quad (1)$$

where $\#(q,y)$ denotes the number of times that the base query q is post-qualified with the year y in either the reformulated query data (e.g., see FIG. 2) or in the raw query log (e.g., see FIG. 1). Similarly, $\#(y,q)$ is the number of times that q is pre-qualified with the year y. Therefore, this weight measures how likely q is to be qualified with y, which forms the basis of the mining and analysis in this particular embodiment.

The following methodology may then be employed for automatically mining implicitly year qualified queries. Given a query q, we first compute $w(q, y)$ for all plausible years. We then use the following function to determine if a query is implicitly year qualified:

$$isIYQQ(q) = \begin{cases} 1 & |\{y: w(q, y) > 0\}| \geq 2 \\ 0 & \text{otherwise} \end{cases}$$

which simply states that a query is considered likely to be implicitly year qualified if it is qualified by at least two unique years. In this example, we set the threshold at 2 because we are interested in temporally recurring events. However, it is possible to mine one-time events by lowering the threshold to 1, although this may also introduce spurious or noisy detections.

Even though a query is identified as implicitly year qualified does not necessarily mean that the query should always be treated as temporal in nature. Consider the query "chi", which corresponds to the name of a popular human-computer interaction conference. This query is clearly temporal, and indeed, the algorithms described herein would detect the query as being implicitly year qualified. However, "chi" is a very common term that is often reformulated or qualified in many different ways, including "chi squared" (statistical test), "chi chis" (restaurant), and "chi omega" (sorority). In fact, these other reformulations and qualifications are much more common than the temporal ones. We call this phenomenon temporal ambiguity. Implicitly year qualified queries, such as "chi" that are associated with many different reformulations are temporally ambiguous, whereas other queries, such as "cikm" (an abbreviation of an annual conference) that are almost exclusively reformulated or qualified with a year are deemed temporally unambiguous. According to a particular embodiment, we quantify temporal ambiguity as follows:

$$\alpha(q) = \frac{\sum_y w(q, y)}{\sum_x \#(q,x) + \sum_{x|} \#(x,q)}$$

where the sums $\Sigma x \#(q,x)$ and $\Sigma x(x,q)$ go over all pre- and post-qualifications for the query q. It should be apparent that if the query is always qualified with a year, i.e., x=y, then $\alpha(q)=1$. Although we call this measure temporal ambiguity, it may also be interpreted as a confidence value that the query is temporal.

Now that we have shown that we can reliably mine implicitly year qualified queries, we now describe how the information mined can be used to improve search quality for these types of queries using result set reordering and temporal query expansion techniques. According to some implementations, such techniques attempt to bias the result sets towards documents that contain highly weighted years that are associated with the query while taking temporal ambiguity and freshness into account.

According to one approach, the score of a document d may be adjusted in response to query q according to the years contained in the document. That is, given an implicitly year qualified query q, the qualified years associated with q may be weighted as follows:

$$z(q, y) = N(y; \mu, \sigma^2) \cdot \alpha(q) \cdot \frac{w(q, y)}{\max_y w(q, y)}$$

where $N(y; \mu, \sigma^2)$ is a normal distribution with mean $\mu$ and variance $\sigma^2$, $\alpha(q)$ is the temporal ambiguity (equation (2)), and $w(q, y)$ is the number of times that query q is qualified with year y (equation (1)).

The first component, $N(y; \mu, \sigma^2)$, models the a priori preference for a given year. According to one embodiment, a normal distribution was used with $\mu=2008$ and $\sigma^2=1$ in order to impose a preference for recent years. However, the normal distribution can be replaced with any reasonable distribution or weighting to impose other reasonable types of preferences. Indeed, this value can be set to a constant, which would correspond to a uniform preference over years. The second component, $\alpha(q)$, models the confidence that the given query is temporal. If $\alpha(q)$ is large, then the query is very likely to be temporal, and therefore will receive a higher weight. The third component, $[w(q,y)]/[\max_y w(q,y)]$, is the normalized year qualified weight for the year as estimated from the query log. Thus, recent years that have large year qualified weights for temporally unambiguous queries will have large $z(q, y)$ weights.

Given a ranking function $S(q, d)$ that produces a score for documents d in response to query q, the $z(q, y)$ weights may be used to temporally bias $S(q, d)$ as follows:

$$S'(q, d) = S(q, d) + \lambda \sum_{y \in d} z(q, y)$$

where $S'(q, d)$ is the temporally biased score, $S(q, d)$ is the original score of document d with respect to query q, $\lambda$ is used to scale the temporal score adjustment, and y∈d denotes the set of years that occur in document d. Documents are then reordered according to $S'(q, d)$ to produce the final temporally-biased ranking.

The reordering approach described above does not modify the original query. Instead, it modifies the scores returned by the underlying ranking function. Therefore, according to another approach, and as described above, temporal references are added to queries. That is, given an implicitly year qualified query q, $z(q, y)$ is computed for every year associated with q. All years with negligible $z(q, y)$ values are then discarded (we use 0.001 as a cutoff). An expanded query is then constructed that has the following form:

$$\#\text{query}(q\#\text{wsyn}(\approx(q,y_1)y_1 \ldots z(q,y_N)y_N))$$

where q is the original query, $z(q, y)$ are the weights as described above, and #wsyn is a weighted synonym query operator. The #wsyn operator treats all of the years y1 ... yN as a single "term" for the purposes of computing term statistics, such as tf, idf, etc. However, whenever a year within the operator is matched in the document, the match is weighted according to the associated z(q, y) value. For example, the query "SIGIR" (Special Interest Group on Information Retrieval) is expanded to the following query:

query(SIGIR#wsyn(0.003 2005 04100 2006 2007
0.706 2008))

For this query, documents that match 2008 will use a text match weight of 0.706 for ranking, whereas documents that match 2005 will use a text match weight of just 0.003 for ranking. Given a reasonable ranking function that knows how to interpret the weighted synonym query operator, documents that match more highly weighted terms, especially in important fields such as the anchor text or title, will be ranked higher, as will documents that match "SIGIR 2008" as an exact phrase.

Figure 4:
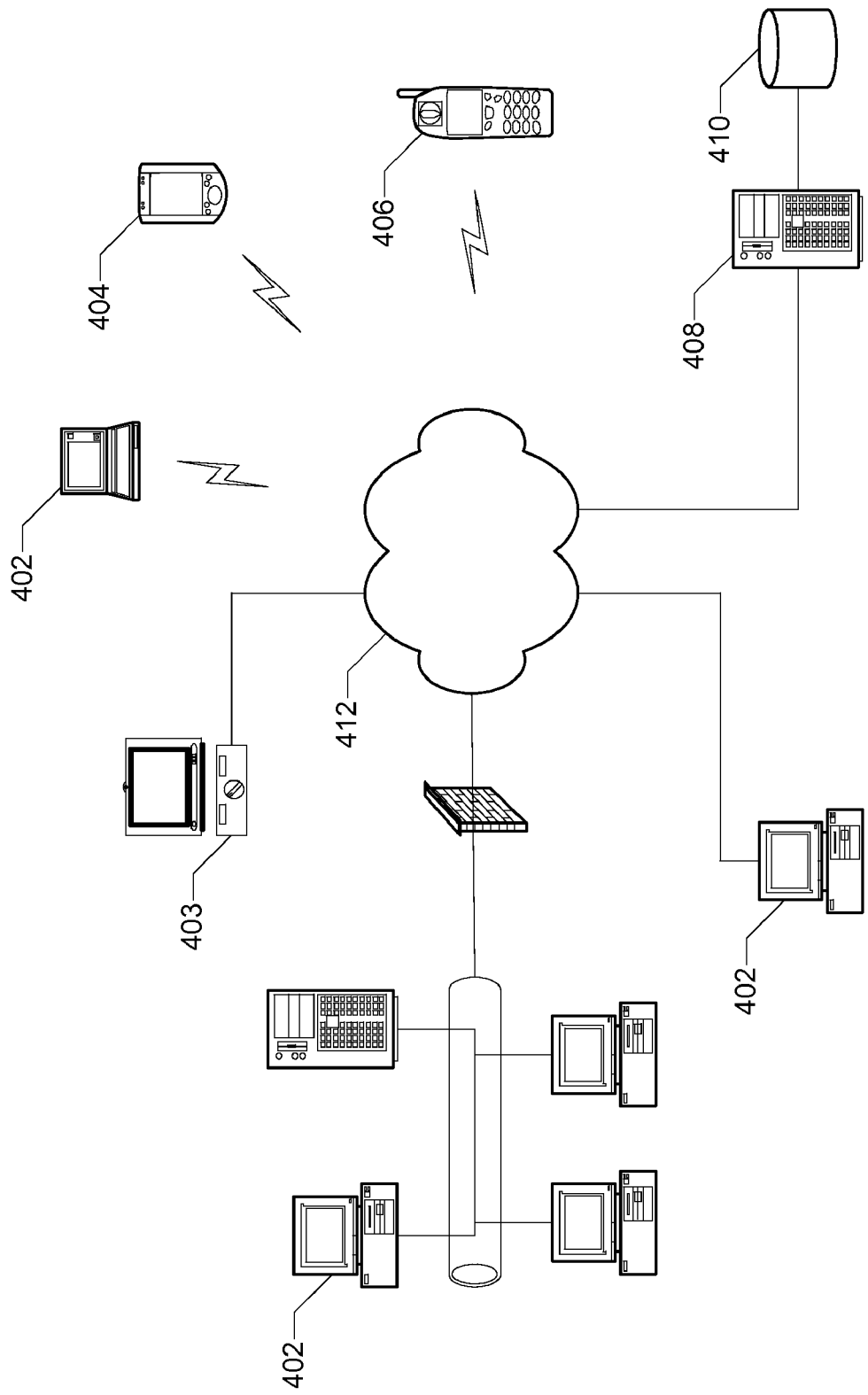
FIG. 4 is a simplified diagram of a computing environment in which embodiments of the invention may be implemented.

Embodiments of the present invention may be employed to provide search services in any of a wide variety of computing contexts and using any of a wide variety of technologies. For example, as illustrated in FIG. 4, implementations are contemplated in which the relevant population of users interacts with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform. The processing of query logs and the providing of search services in accordance with the invention are represented in FIG. 4 by server 408 and data store 410 which, as will be understood, may correspond to multiple distributed devices and data stores operated by one or more entities.

The invention may also be practiced in a wide variety of network environments (represented by network 412) including, for example, TCP/IP-based networks, telecommunications networks, wireless networks, etc. In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention have been described herein with reference to the generation of organic search results responsive to a query identified as likely to be an implicitly year qualified query. However, it will be understood that the principles described herein may just as readily be applied to the generation of sponsored search results. That is, queries may be identified and expanded in accordance with the invention to generate organic search results, sponsored search results, or both.

Similarly, embodiments of the invention have been described herein with reference to identifying and expanding queries that are likely to have an implied year. However, it should be understood that embodiments of the present invention are not so limited. Rather, the scope of the invention includes any temporal aspect or reference which may be identified using the techniques described herein. Such temporal references might include, for example, times of day, individual dates or days of the week, or specific weeks, months, decades, centuries, millennia, etc.

In addition, embodiments of the invention are contemplated in which the ability to identify implicitly temporally qualified queries may be leveraged in ways which do not necessarily require reformulation of such queries. For example, a "post-processing" approach to document scoring is described above in which a document score based on a conventional ranking function (i.e., S(q, d)) is adjusted (i.e., to get S'(q, d)) with reference to mined query log data. However, another approach is also contemplated in which, instead of modifying a document score generated by a conventionally derived ranking function, a specialized ranking function is provided that takes into account the temporal information mined from query logs. According to a particular class of embodiments, such a specialized ranking function is created by training the new function, call it T(q, d), on a more constrained query set, e.g., queries which are explicitly year qualified queries as determined, for example, as described above.

A conventionally derived ranking function depends on many variables (often hundreds). The importance of the variables is tuned to optimize relevance on a general (i.e., random) query set. However, some features that are useful for temporally qualified queries may not be considered as important in a general ranking function because there is not enough evidence in the random training data. By contrast, when temporally qualified queries are separated out and relevance is optimized with reference to this reduced set of queries, the importance of such features in the resulting specialized ranking function will be emphasized.

Figure 5:
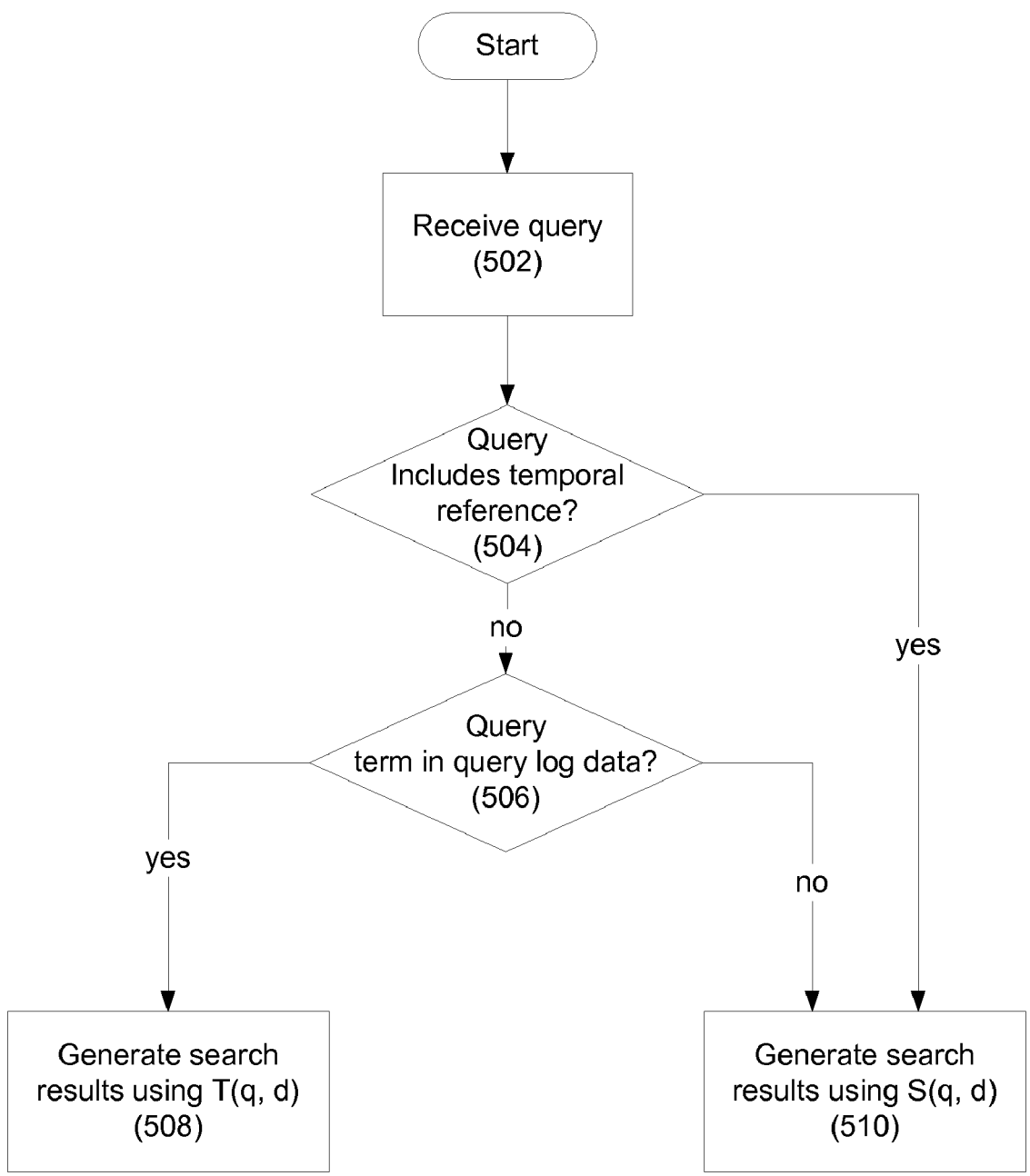
FIG. 5 is a flowchart illustrating identification of implicitly temporally qualified queries and generating search results according to a particular embodiment of the invention.

The manner in which such a specialized ranking function could be used may be understood with reference to the flowchart of FIG. 5. When a query is received (502), it is determined whether the query contains a temporal reference, e.g., a reference to a year (504), and if not, whether the query contains a query term represented in the query log data (506). If a query term is present which is also in the query log data, the query is considered an implicitly year qualified query, and search results are generated and ranked in accordance with the specialized ranking function, T(q, d) (508). Otherwise, search results are generated and ranked using a conventionally derived ranking function, S(q, d) (510). It should be noted that such a specialized ranking function may be used in combination with the query reformulation described above.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for responding to a first search query that does not include an explicit temporal qualification, comprising:
receiving the first search query from a user device;
determining that the first search query is implicitly temporally qualified with reference to a first query term included in the first search query and query log data that relate a plurality of previous query terms included in previous search queries by a plurality of users to explicit temporal references included in the previous search queries, wherein the query log data represent frequencies with which the previous query terms were associated with particular ones of the explicit temporal references in the previous search queries, and wherein the previous query terms are included in the query log data only where the frequency with which each of the previous query terms was associated with at least one of the explicit temporal references in the previous search queries exceeds a programmable threshold, and wherein the first query term is associated with a first plurality of the explicit temporal references in the query log data;

expanding the first search query to include one or more of the explicit temporal references;

generating first search results using the expanded first search query, wherein the first search results are biased in accordance with the frequency with which each of the first plurality of explicit temporal references is associated with the first query term in the query log data; and transmitting the first search results to the user device.

2. The method of claim 1 further comprising including each of the previous query terms in the query log data only where the previous queries including the previous query terms had been reformulated from original queries including the previous query terms but not explicitly including any of the explicit temporal references.

3. The method of claim 1 wherein expanding the first search query comprises expanding the first search query to include each of the first plurality of explicit temporal references.

4. The method of claim 1 wherein the first search results comprise one or more of organic search results or sponsored search results.

5. A computer-implemented method for presenting search results on a user device in response to a first search query that does not include an explicit temporal qualification, comprising:

providing a search interface on the user device in which a user enters the first search query; and providing a search results interface on the user device in which search results are presented that are responsive to a first expanded version of the first search query, the first expanded version of the first search query including one or more of a plurality of explicit temporal references not included in the first search query based upon query log data that relate a plurality of previous query terms included in previous search queries by a plurality of users to the explicit temporal references included in the previous search queries, wherein the query log data represent frequencies with which the previous query terms were associated with particular ones of the explicit temporal references in the previous search queries, and wherein the previous query terms are included in the query log data only where the frequency with which each of the previous query terms was associated with at least one of the explicit temporal references in the previous search queries exceeds a programmable threshold, and wherein the first query term is associated with a first plurality of the explicit temporal references in the query log data, the search results being biased in accordance with the frequency with which each of the first plurality of explicit temporal references is associated with the first query term in the query log data.

6. The method of claim 5 further comprising providing an indication in the search results interface that the search results are responsive to the first expanded version of the first search query rather than the first search query.

7. The method of claim 6 further comprising providing a mechanism in the search results interface by which the user requests further search results responsive to the first search query.

8. The method of claim 6 further comprising providing a mechanism in the search results interface by which the user requests further search results responsive to a second expanded version of the first search query including a different temporal reference than the first expanded version of the first search query.

9. The method of claim 5 wherein the search results comprise one or more of organic search results or sponsored search results.

10. A computer-implemented method for responding to a first search query that does not include an explicit temporal qualification, comprising:

receiving the first search query from a user device;

determining that the first search query is implicitly temporally qualified with reference to a first query term included in the first search query and query log data that relate a plurality of previous query terms included in previous search queries by a plurality of users to explicit temporal references included in the previous search queries, wherein the query log data represent frequencies with which the previous query terms were associated with particular ones of the explicit temporal references in the previous search queries, and wherein the previous query terms are included in the query log data only where the frequency with which each of the previous query terms was associated with at least one of the explicit temporal references in the previous search queries exceeds a programmable threshold, and wherein the first query term is associated with a first plurality of the explicit temporal references in the query log data;

generating first search results responsive to the first search query, the first search results being ranked in accordance with a predetermined ranking function derived with reference to the query log data, and wherein the first search results are biased in accordance with the frequency with which each of the first plurality of explicit temporal references is associated with the first query term in the query log data; and transmitting the first search results to the user device.

11. The method of claim 10 further comprising including each of the previous query terms in the query log data only where the previous queries including the previous query terms had been reformulated from original queries including the previous query terms but not explicitly including any of the specific temporal references.

12. The method of claim 10 wherein the first search results comprise one or more of organic search results or sponsored search results.

13. The method of claim 10 further comprising deriving the predetermined ranking function by training the predetermined ranking function on a temporally qualified query set represented by the query log data.

14. A system for responding to a first search query that does not include an explicit temporal qualification, the system comprising:

at least one data store having query log data stored therein, the query log data relating a plurality of previous query terms included in previous search queries by a plurality of users to explicit temporal references included in the previous search queries, wherein the query log data represent frequencies with which the previous query terms were associated with particular ones of the explicit temporal references in the previous search queries, and wherein the previous query terms are included in the query log data only where the frequency with which each of the previous query terms was associated with at least one of the explicit temporal references in the previous search queries exceeds a programmable threshold, and wherein a first query term included in the first search query is associated with a first plurality of the explicit temporal references in the query log data; and at least one computing device configured to:
receive the first search query from a user device;
determine that the first search query is implicitly temporally qualified with reference to the first query term included in the first search query and the query log data;
generate first search results responsive to the first search query and taking the query log data into account, wherein the first search results are biased in accordance with the frequency with which each of the first plurality of explicit temporal references is associated with the first query term in the query log data; and
transmit the first search results to the user device.

* * * * *